(12) United States Patent
Hatmaker, Jr.

(10) Patent No.: US 11,684,027 B2
(45) Date of Patent: Jun. 27, 2023

(54) VINE INHIBITING CONE AND METHOD OF USE THEREOF

(71) Applicant: Dale Keith Hatmaker, Jr., Lafollette, TN (US)

(72) Inventor: Dale Keith Hatmaker, Jr., Lafollette, TN (US)

( * ) Notice: Subject to any disclaimer, the term of this patent is extended or adjusted under 35 U.S.C. 154(b) by 0 days.

(21) Appl. No.: 17/397,706

(22) Filed: Aug. 9, 2021

(65) Prior Publication Data

US 2021/0360878 A1 Nov. 25, 2021

Related U.S. Application Data

(63) Continuation-in-part of application No. 16/362,619, filed on Mar. 23, 2019, now Pat. No. 11,085,506.

(51) Int. Cl.
*E04H 12/20* (2006.01)
*A01G 17/08* (2006.01)

(52) U.S. Cl.
CPC ............. *A01G 17/08* (2013.01); *E04H 12/20* (2013.01)

(58) Field of Classification Search
CPC ............ F16G 11/00; A01G 9/12; E04H 12/20
See application file for complete search history.

(56) References Cited

U.S. PATENT DOCUMENTS 2,061,306 A * 11/1936 Hocher .................. F16G 11/06
52/147

* cited by examiner

*Primary Examiner* — Patrick J Maestri
(74) *Attorney, Agent, or Firm* — Technology Law, PLLC

(57) ABSTRACT

A method of restricting the growth of vines along a guy wire includes possessing a member defining a tapered chamber having first and second openings. The chamber is tapered such that the chamber is widest at the first opening. The method further includes positioning the member such that the guy wire extends through the first opening, the second opening, and the tapered chamber.

8 Claims, 4 Drawing Sheets

VINE INHIBITING CONE AND METHOD OF USE THEREOF

CROSS-REFERENCE TO RELATED APPLICATION

This application is a continuation-in-part of U.S. patent application Ser. No. 16/362,619, filed Mar. 23, 2019, and which is hereby incorporated by reference in its entirety.

TECHNICAL FIELD

This disclosure relates to methods and apparatuses for limiting the growth of vines.

BACKGROUND

Guy wires are often used to add stability to free-standing poles and other structures, including, for example, telephone and power line poles. Vines are plants that will grow along rigid structures, including guy wires. This can be problematic because the weight of the vine may damage the guy wire or the structure that the guy wire is stabilizing. Some vines, notably kudzu, can even climb the entire guy wire and then envelope telephone or power lines, which may interfere with signal or power transmission.

Kudzu often climbs up guy wires and either weaves into the hot wire or causes the pole to fall, causing an interruption in the power supply. Electric utilities must spend substantial resources to clear kudzu from power transmission lines.

SUMMARY

A method of restricting the growth of vines along a guy wire is provided. The method includes possessing a member defining a tapered chamber having first and second openings. The chamber is tapered such that the chamber is widest at the first opening. The method further includes positioning the member such that the guy wire extends through the first opening, the second opening, and the tapered chamber.

In use, the growing end of a vine climbing the guy wire will enter the chamber through the first opening. Once in the chamber, the tapered inner surface of the member will deflect the growth of the vine downward, causing the vine to succumb to its own weight. Furthermore, in one embodiment, the member defining the chamber is substantially opaque. The vine will sense the lack of light inside the chamber, which will also stop the vine from further growth along the guy wire.

Accordingly, the method provides a physical barrier that will effectively stop the growth of vines along guy wires. The method is cost-effective compared to the prior art because a single application of the member to a guy wire may prevent the growth of vines for several years, thereby eliminating the need to clear vine growth manually or through herbicides several times per year.

A corresponding system for restricting vine growth is also provided.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
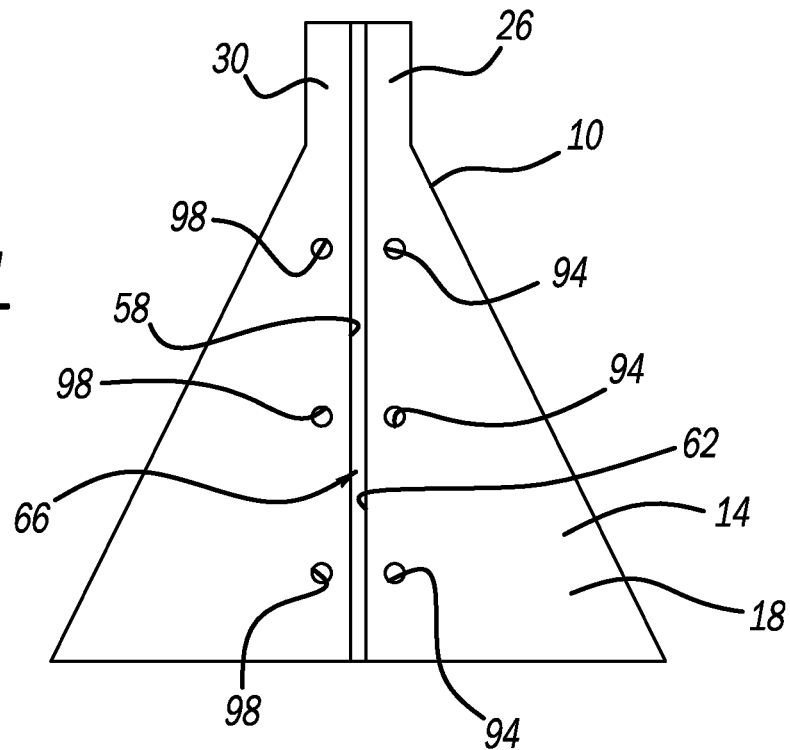
FIG. 1 is a schematic, side view of a member having a tapered chamber.

Referring to the Figures, wherein like reference numbers refer to like components throughout, a vine inhibiting cone assembly 8 includes a member 10. The member 10 includes a first part 14 that defines a frusto-conical outer surface 18 and a frusto-conical inner surface 22. The member 10 also includes a second part 26 that defines a cylindrical outer surface 30 and a cylindrical inner surface 34. The frusto-conical inner surface 22 and the cylindrical inner surface 34 cooperate to define a chamber 38 that extends through the member 10.

The first part 14 of the member 10 defines a first opening 42 to the chamber 38. The second part 26 of the member 10 defines a second opening 46 to the chamber 38. The chamber 38 includes a tapered, frusto-conical portion 50 defined by inner surface 22, and a cylindrical portion 54 defined by inner surface 34. The diameter of the frusto-conical portion 50 of the chamber 34 is largest at the first opening 42 and decreases with proximity to the cylindrical portion 54. The cylindrical portion 54 of the chamber 34 has a constant diameter between the frusto-conical portion 50 and the second opening 46.

It should be noted that, though the tapering portion 50 of the chamber 38 is frusto-conical, any tapering geometry may be employed within the scope of the claimed invention. For example, the tapering portion 50 and surface 22 may be a paraboloid such that the width of the chamber is wider at opening 42 and narrows with distance from the opening 42.

The member 10 also includes two edges 58, 62 that extend between the first and second openings 42, 46. Prior to installation on a guy wire, edges 58, 62 cooperate to define a third opening 66 therebetween, as shown in FIG. 1. The third opening 66 is contiguous with the first and second openings 42, 46.

Figure 2:
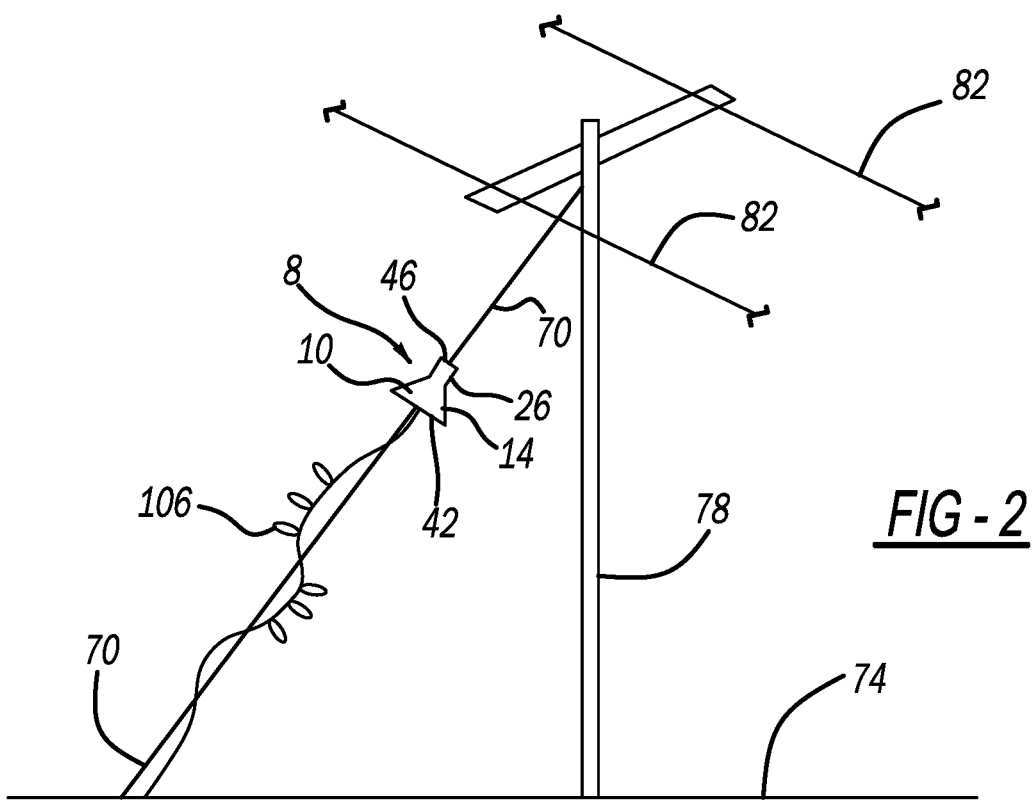
FIG. 2 is a schematic, side view of the member attached to a guy wire for a utility pole.

FIG. 2 depicts a method of use of the member 10. Referring specifically to FIG. 2, a guy wire 70 operatively interconnects the ground 74 and a vertical structure such as a utility pole 78 as understood by those skilled in the art. In the example shown in FIG. 2, the utility pole 78 supports a plurality of electrically conductive wires 82. Wires 82 may, for example, be electrical power transmission lines or telephone signal transmission lines. However, any guy wire stabilizing any structure may be employed within the scope of the claims. For example, a guy wire 70 may be employed with a radio transmission tower.

Figure 3:
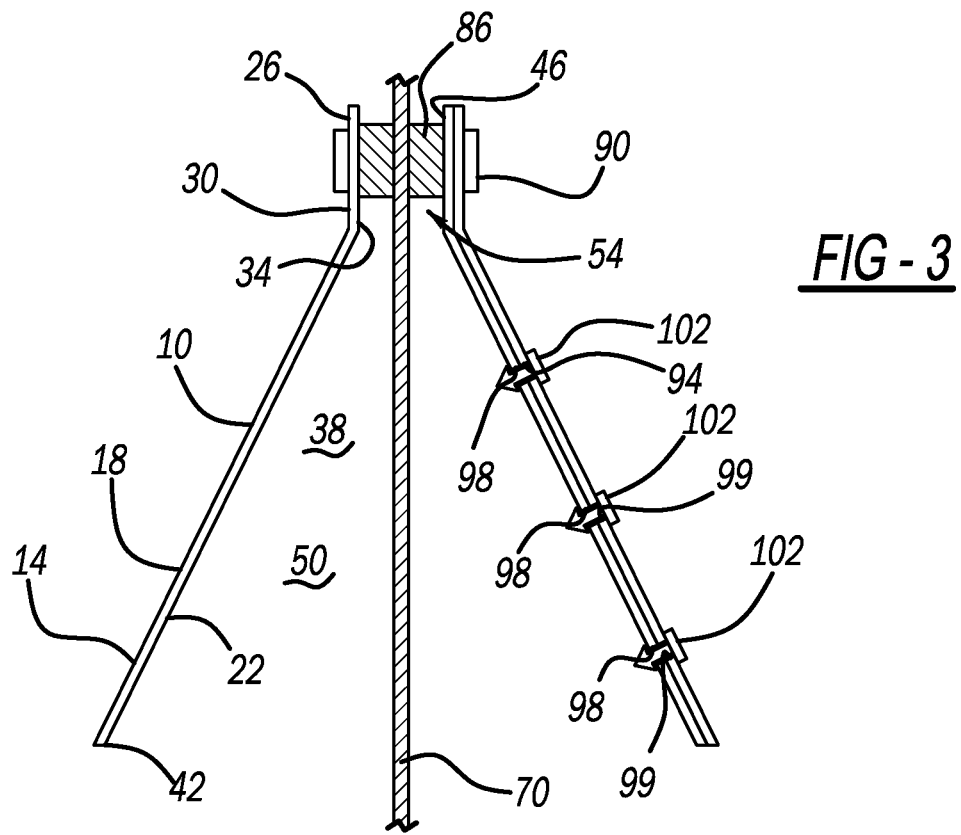
FIG. 3 is a schematic, cross-sectional side view of the member attached to the guy wire.
Figure 4:
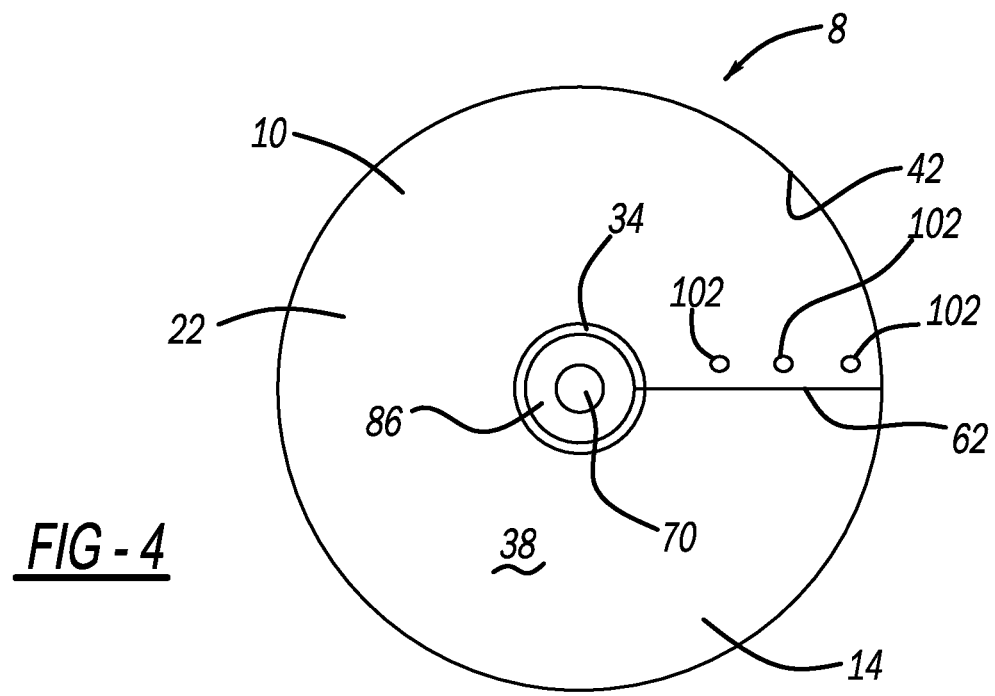
FIG. 4 is a schematic, bottom view of the member attached to the guy wire.

Referring to FIGS. 2-4, the guy wire 70 extends through the first opening 42, the chamber 38, and the second opening 46. As shown in FIGS. 3 and 4, the chamber 38 has only a single unobstructed opening, i.e., the first opening 42. The second opening 46 is entirely obstructed by the guy wire 70 and an elastomeric bushing member 86. The elastomeric bushing member 86 concentrically surrounds and contacts the guy wire 70, and fills the volume between the guy wire 70 and the cylindrical inner surface 34. The elastomeric bushing member 86 may, for example, be an annular member, or it may have another shape or configuration that is wrapped around the guy wire 70.

A clamp 90, such as a radiator clamp, is applied to the cylindrical outer surface 30 such that the clamp 90 exerts a compressive force radially inward on the second part 26. The compressive force is transmitted through the member 10 to the elastomeric bushing member 86 and the guy wire 70. Accordingly, the clamp 90 retains the member 10 in place on the guy wire 70 and also ensures that the second opening 46 remains obstructed.

The third opening shown at 66 in FIG. 1 enables the placement of the guy wire 70 in the chamber 38. Placing the member 10 on the guy wire 70 includes inserting the guy wire 70 into the chamber 38 through the third opening 66 between edges 58, 62. The third opening 66 is then closed and/or obstructed as shown in FIGS. 3 and 4. In the embodiment depicted, the third opening 66 is closed by deforming the member 10 such that the edges 58, 62 do not define the third opening therebetween. The member 10 defines a first plurality of holes 94 adjacent to edge 62 and a second plurality of holes 98 adjacent to edge 58. To close the third opening 66, the member 10 is deformed such that each of the holes 94 is aligned with a respective one of the holes 98. Snap fasteners 102 are then inserted through the holes 94, 98 as shown in FIGS. 3 and 4 to maintain the closure of the third opening.

Referring again to FIG. 2, the first opening 42 is positioned such that a vine 106 growing upward along the guy wire 70 will enter the chamber 38 through the first opening 42. The inner surface 22 will then deflect the vine downward, preventing the continued growth of the vine 106 along the guy wire 70. The member 10 is preferably formed of a non-conductive polymeric material with a UV coating to prolong its life.

Figure 5:
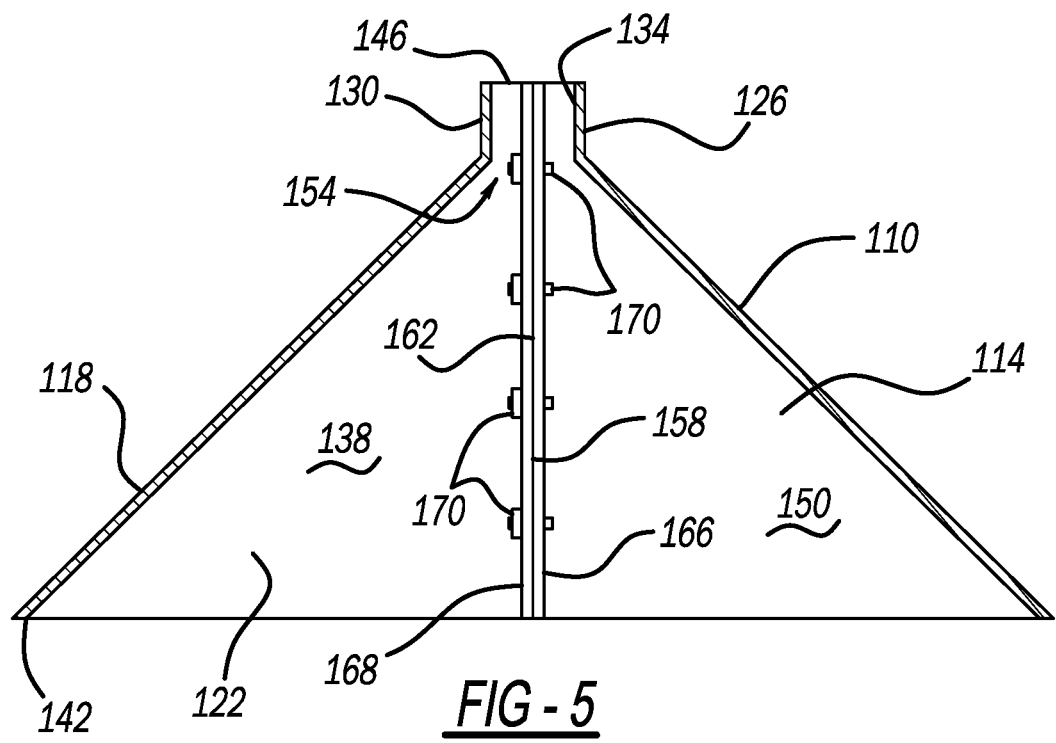
FIG. 5 is a schematic, section, side view of an alternative member having a tapered chamber.

FIGS. 5-9, wherein like reference numbers refer to like components from FIGS. 1-4, schematically depict a method of reinforcing a vine inhibiting member 110. Referring specifically to FIG. 5, the vine inhibiting member 110 includes a first part 114 that defines a frusto-conical outer surface 118 and a frusto-conical inner surface 122. The member 110 also includes a second part 126 that defines a cylindrical outer surface 130 and a cylindrical inner surface 134. The frusto-conical inner surface 122 and the cylindrical inner surface 134 cooperate to define a chamber 138 that extends through the member 110.

The first part 114 of the member 110 defines a first opening 142 to the chamber 138. The second part 126 of the member 110 defines a second opening 146 to the chamber 138. The chamber 138 includes a tapered, frusto-conical portion 150 defined by inner surface 122, and a cylindrical portion 154 defined by inner surface 134. The diameter of the frusto-conical portion 150 of the chamber 134 is largest at the first opening 142 and decreases with proximity to the cylindrical portion 154. The cylindrical portion 154 of the chamber 134 has a constant diameter between the frusto-conical portion 150 and the second opening 146.

It should be noted that, though the tapering portion 150 of the chamber 138 is frusto-conical, any tapering geometry may be employed within the scope of the claimed invention. For example, the tapering portion 150 and surface 122 may be a paraboloid such that the width of the chamber is wider at opening 142 and narrows with distance from the opening 142.

The member 10 also includes two edges 158, 162 that extend between the first and second openings 142, 146. Prior to installation on a guy wire, edges 158, 162 cooperate to define a third opening therebetween, similar to the opening shown at 66 in FIG. 1. The third opening 66 is contiguous with the first and second openings 42, 46. Each of the edges 158, 162 terminates in a respective flange 166, 168 that extends or protrudes into the chamber 138.

Figure 6:
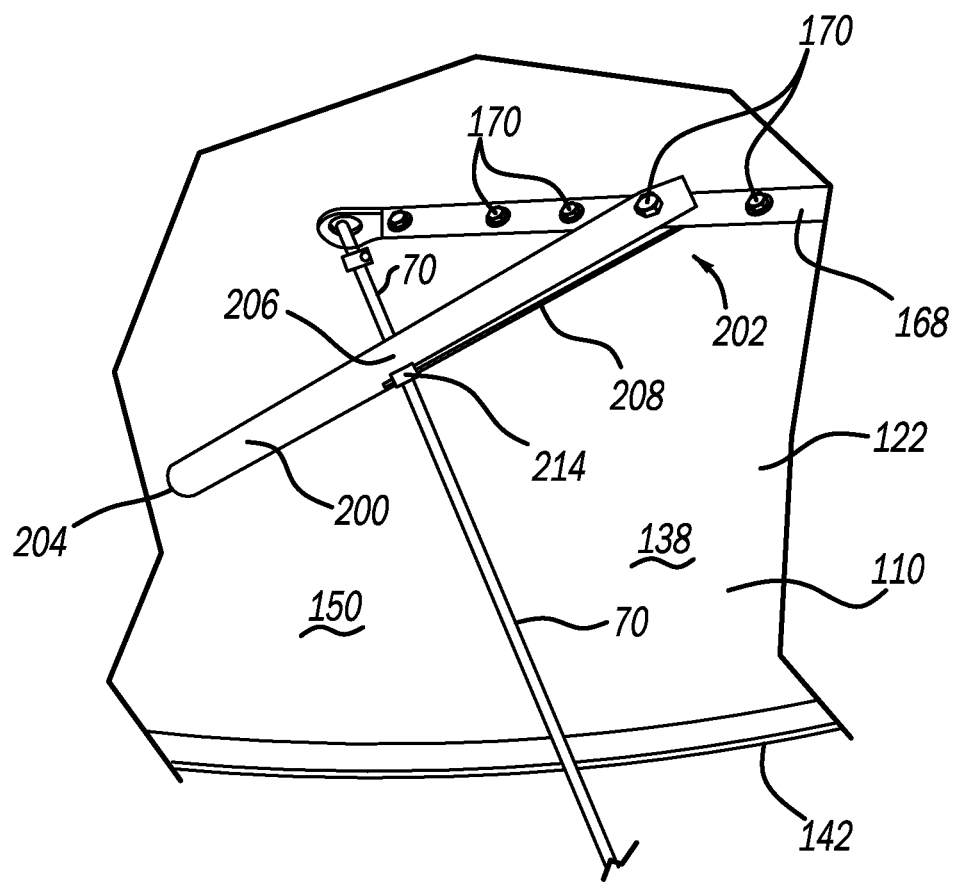
FIG. 6 is a schematic, perspective view of the alternative member of FIG. 4 attached to a guy wire and engaging with a reinforcement member.
Figure 7:
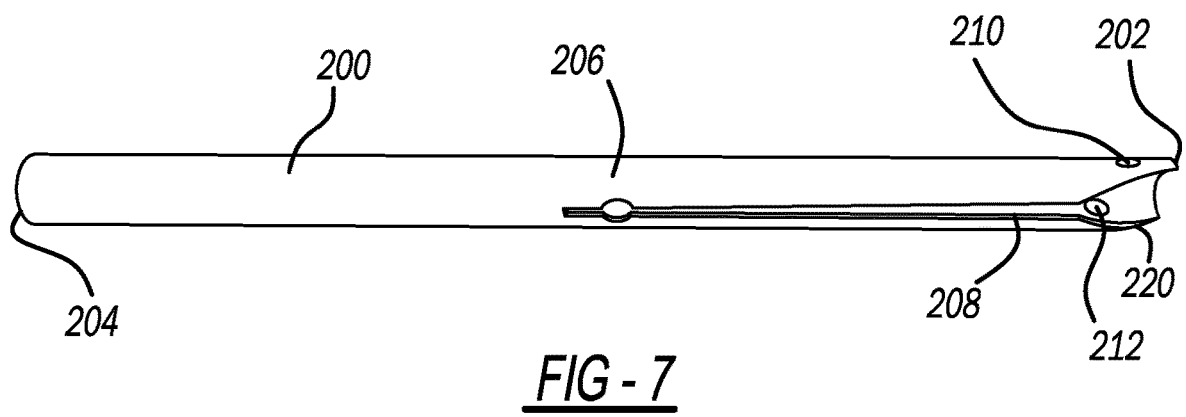
FIG. 7 is a schematic, perspective view of the reinforcement member.
Figure 8:
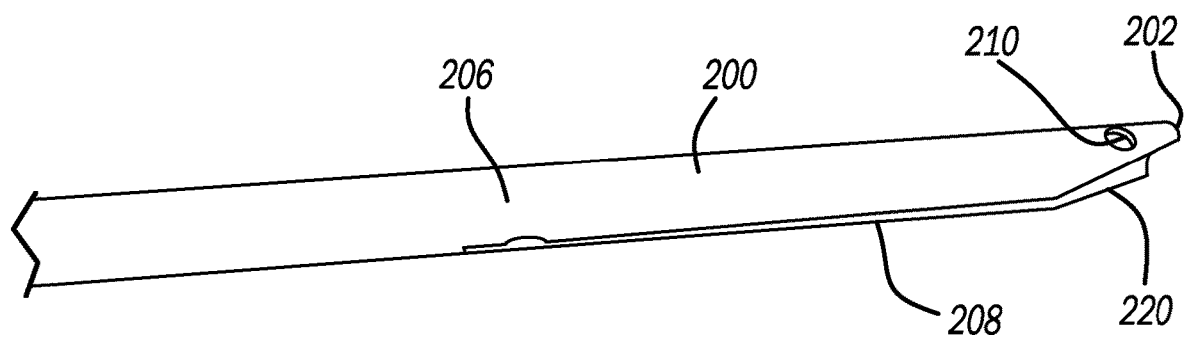
FIG. 8 is another schematic, perspective view of the reinforcement member.
Figure 9:
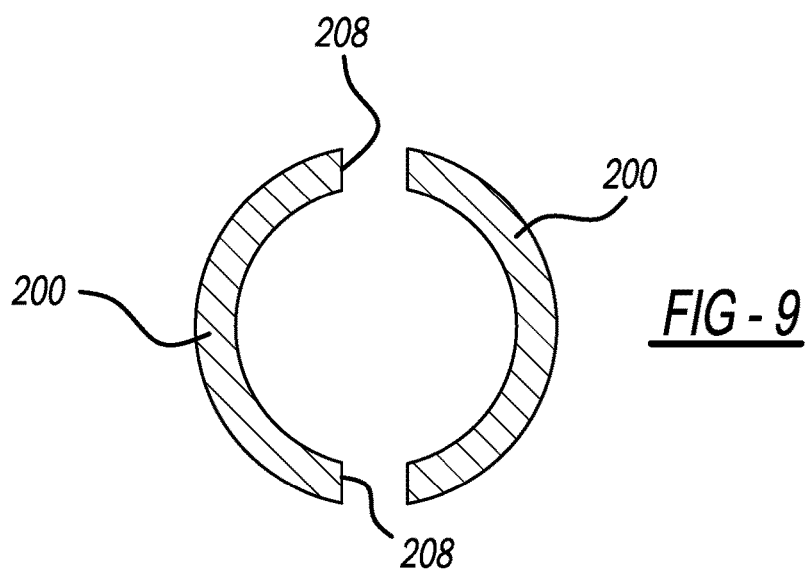
FIG. 9 is a schematic, cross-sectional view of the reinforcement member taken about a plane that is perpendicular to its longitudinal axis.

After guy wire 70 has been passed through the opening between edges 158, 162 so that the guy wire 70 extends through the first opening 142, second opening 146, and the chamber 138, as shown in FIG. 6, the edges 158, 162 are brought together and the opening therebetween is closed. Threaded fasteners 170, such as bolts with nuts, extend through holes in the flanges 166, 168 as shown in FIGS. 5 and 6 to fasten the edges 158, 162 together.

After the member 110 is positioned so that the guy wire 70 extends therethrough, a method of reinforcing the member 110 includes obtaining a reinforcement member 200. Referring to FIGS. 6-9, the reinforcement member 200 in the embodiment depicted is a cylindrical tube having a first end 202, a second end 204, a midpoint 206 between the first end 202 and the second end 204. The reinforcement member 200 further defines a slot 208 that extends through the member 200 from the first end 202 to the midpoint 206.

The reinforcement member 200 is transported to the vine-inhibiting member 110 at the guy wire 70 and is moved and positioned such that the guy wire 70 extends through the slot 208 at or near the midpoint 206. The slot 208 extending from the first end 202 to the midpoint 206 permits the guy wire 70 to go through the midpoint 206 while the ends of the guy wire 70 are inaccessible to the user. The method includes mounting the first end 202 to the flanges 166, 168. In the embodiment depicted, the reinforcement member 200 defines two holes 210, 212 at or near the first end 202; mounting the first end 202 to the flanges 166, 168 includes extending one of the threaded fasteners 170 through the holes 210, 212 and the flanges 166, 168.

The reinforcement member is positioned so that the second end 204 contacts the inner surface 122, as shown in FIG. 6, and then a clamp 214 is secured to the guy wire 70 below the reinforcement member 200 to maintain the reinforcement member 200 in the position shown (i.e., extending across the tapered portion 150 of the chamber 138, with the second end 204 contacting the inner surface 122 and the first end 202 connected to the flanges 166, 168.

The reinforcement member 200 thus enables rapid and cost-effective reinforcement of a vine-inhibiting member 110 mounted to a guy wire 70 without removing the member 110 from the guy wire. The reinforcement member 200 may be easily fabricated from readily available materials such as a PVC or other polymeric tube. The reinforcement member 200 has been found to significantly improve the durability of a vine-inhibiting member. In the embodiment depicted, a beveled cut-out 220 is defined at the first end 202 to accommodate the tapered surface 122.

While the best modes for carrying out the invention have been described in detail, those familiar with the art to which this invention relates will recognize various alternative designs and embodiments for practicing the invention within the scope of the appended claims.

The invention claimed is:

1. A system for inhibiting vine growth comprising:
a structure;
a guy wire interconnecting the structure and the ground;
a vine-inhibiting member having an inner surface defining a chamber having a first opening and a second opening;
wherein the guy wire extends through the first opening, the chamber, and the second opening;
wherein the chamber is tapered such that the chamber is widest at the first opening;
wherein the chamber has only a single unobstructed opening; and wherein the single unobstructed opening is the first opening;
wherein the vine-inhibiting member defines at least one flange extending into the chamber;
a reinforcement member extending across the chamber and being mounted to said at least one flange;
wherein the reinforcement member has a first end, a second end, and a midpoint between the first end and the second end, and a slot that extends through the reinforcement member from the first end to the midpoint;
wherein the guy wire extends through the slot at or adjacent to the midpoint;
a clamp mounted to the guy wire and supporting the reinforcement member such that the second end contacts the inner surface; and
wherein said at least one flange extends into the slot.

2. The system of claim 1, wherein the reinforcement member defines at least one hole; and
wherein the system includes a fastener extending through said at least one hole and said at least one flange.

3. A method comprising:
obtaining a reinforcement member having a first end, a second end, a midpoint between the first end and the second end; and a slot that extends from the first end to the midpoint;
transporting the reinforcement member to a vine-inhibiting member having an inner surface defining a tapered chamber with a guy wire extending therethrough;
moving the reinforcement member such that the guy wire extends through the slot at or near the midpoint;
mounting the first end to the vine-inhibiting member;
applying a clamp to the guy wire under the reinforcement member such that the second end contacts the inner surface;
wherein the vine-inhibiting member defines at least one flange that protrudes into the tapered chamber;
wherein the reinforcement member defines at least one hole at or near the first end; and
wherein said mounting the first end to the vine inhibiting member includes extending a fastener through said at least one hole and said at least one flange.

4. The method of claim 3, wherein said at least one flange extends through a portion of the slot.

5. The method of claim 4, wherein the reinforcement member is cylindrical.

6. The method of claim 5, wherein the reinforcement member is formed of a polymeric material.

7. A system for inhibiting vine growth comprising:
a structure;
a guy wire interconnecting the structure and the ground;
a vine-inhibiting member having an inner surface defining a chamber having a first opening and a second opening;
wherein the guy wire extends through the first opening, the chamber, and the second opening;
wherein the chamber is tapered such that the chamber is widest at the first opening;
wherein the vine-inhibiting member defines at least one flange extending into the chamber;
a reinforcement member extending across the chamber and being mounted to said at least one flange;
wherein the reinforcement member has a first end, a second end, and a midpoint between the first end and the second end, and a slot that extends through the reinforcement member from the first end to the midpoint;
wherein the guy wire extends through the slot at or adjacent to the midpoint;
a clamp mounted to the guy wire and supporting the reinforcement member such that the second end contacts the inner surface; and
wherein said at least one flange extends into the slot.

8. The system of claim 7, wherein the reinforcement member defines at least one hole; and
wherein the system includes a fastener extending through said at least one hole and said at least one flange.

* * * * *